April 11, 1944.   L. K. HEDDING   2,346,487
REGULATING APPARATUS
Filed Dec. 12, 1941
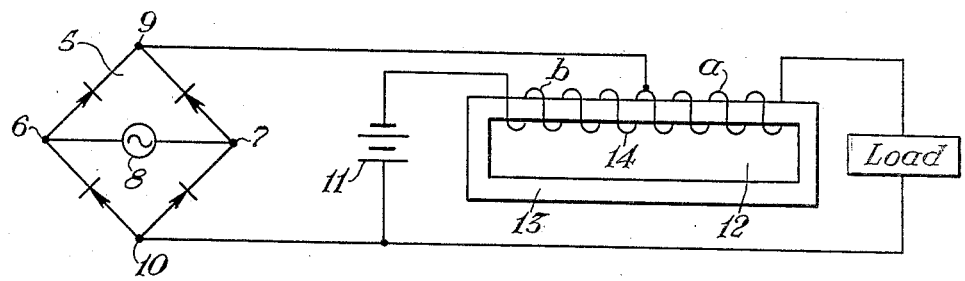
INVENTOR.
Linnie K. Hedding
BY
HIS ATTORNEY Patented Apr. 11, 1944

2,346,487

UNITED STATES PATENT OFFICE 2,346,487

REGULATING APPARATUS

Linnie K. Hedding, Wilkinsburg, Pa., assignor to The Union Switch & Signal Company, Swissvale, Pa., a corporation of Pennsylvania Application December 12, 1941, Serial No. 422,725

3 Claims. (Cl. 175—363)

My invention relates to regulating apparatus, and it has particular reference to apparatus for regulating the current into and from a battery connected across a load in multiple with a rectifier supplying energy to the load.

In a rectifying system of the type wherein a battery is employed as a reserve or stand-by source of power for a load normally supplied with energy from an alternating current source through a rectifier, the apparatus functions to cause current to be supplied from the rectifier to the load and battery during the intervals when the rectifier voltage is peaked, and during the intervals when the rectifier terminal voltage drops, as between successive voltage peaks, the rectifier current is supplemented by current supplied from the battery to the load. This supplemental current to a large extent fills the valleys between successive peaks of the rectified power. Where a primary battery is employed, the apparatus can be adjusted so that for any one given load, the energy supplied to the battery during the voltage peaks substantially corresponds in magnitude to the energy supplied from the battery between voltage peaks. For such a load, therefore, the battery will be maintained substantially at its initial level and accordingly will have a relatively long life.

For varying loads, the current drawn from the battery may be either in excess of or less than that introduced into the battery from the rectifier, depending upon whether the load supplied is greater than or less than that for which the apparatus is adjusted. When the current drawn is less than that available for introduction into the battery, energy is wasted since a portion of the energy introduced into the battery is not stored or used, while if the battery current drawn is in excess of that supplied to the battery, the battery then has a net discharge. In either case, the current drawn from the battery by the load varies in accordance with the load and under full load conditions a relative heavy current is drawn from the battery, thus tending to discharge the battery quickly.

In order to prolong the life of the primary battery, it is desirable to regulate the current into and out of the battery in such manner as to reduce the net drain on the battery under all load conditions, and particularly under full load conditions. It is, therefore, an object of my invention to provide novel and improved regulating apparatus for increasing the life of a primary battery incorporated into a rectifier-battery combination supplying energy to a direct current load.

Another object is the provision of regulating apparatus for reducing the drain on a battery incorporated as a stand-by source in a rectifier-battery combination supplying energy to a direct current load.

An additional object is to provide a novel and improved rectifier-battery combination for supplying energy to a direct current load.

In practicing my invention, the above-mentioned and other important objects and characteristic features which will become readily apparent from the following description, are attained in accordance with my invention by providing a rectifier-battery combination incorporating a regulating reactor comprising a magnetizable core or shell provided with a coil, a portion of which is included in circuit between the output terminals of the rectifier and the load, and the remainder of which coil is interposed in circuit between the rectifier output terminals and the battery.

I shall describe one form of apparatus embodying my invention, and shall then point out the novel features thereof in claims.

The accompanying drawing is a diagrammatic view of one form of apparatus emboying my invention.

According to the invention, the life of a primary battery incorporated into a rectifier-battery combination supplying current to a direct current load, is lengthened by the provision of regulating apparatus associated with the rectifier battery combination. This regulating apparatus functions to reduce the net drain on the battery, particularly under full load conditions.

An illustrative embodiment of apparatus embodying my invention is represented in the drawing, and as there shown the embodiment includes a rectifier-battery combination comprising a full-wave rectifier 5 of the bridge type having four arms comprised of dry disc rectifier devices, such as copper oxide rectifier discs. The input terminals 6 and 7 of rectifier 5 are connected to a suitable alternating current source 8, and the rectifier discs are so orientated as to supply a direct current potential across the remaining two terminals 9 and 10 of the rectifier. A battery 11, preferably of the primary type, is connected across the output terminals of rectifier 5 in multiple with a suitable direct current load.

The rectifier-battery combination thus far described is of the usual type wherein a large portion of the load current is supplied from the battery under full load conditions, hence such a combination requires a relatively heavy discharge from the battery and results in a relative short battery life.

In accordance with the present invention, a regulating device 12 is associated with the rectifier-battery combination for controlling the discharge and charge of the battery. This device comprises a magnetizable core or shell 13 which may have an air gap but which preferably is of the closed type, and a winding or coil 14 mounted on the core. One output terminal 9 of rectifier 5 is connected to a mid terminal tap of winding 14, and one of the outer terminals of the winding is connected through the load to the other rectifier output terminal 10, with the result that a portion $a$ of winding 14 is included in circuit between the rectifier output terminals and the load. The other outer terminal of winding 14 is connected through battery 11 to the other rectifier output terminal 10, hence battery 11 is connected through a portion $b$ of winding 14 across rectifier 5 in multiple with the load. Battery 11 is orientated so as to supply current to the load through winding 14 in the same direction as the current supplied to the load from rectifier 5 through the portion $a$ of winding 14, and the parts are so selected and proportioned that the average voltage supplied to the output terminals of rectifier 5 substantially corresponds to the terminal voltage of battery 11.

The voltage appearing at terminals 9 and 10 of rectifier 5 is pulsating in character and varies in magnitude from a maxium to a minimum of substantially zero twice in each cycle of the alternating current applied to the rectifier. The output voltage of the rectifier may thus be considered as comprising alternate peaks and valleys, and the average value of the voltage is considered as being at some point intermediate the maximum and minimum values of the actual voltage.

During the intervals when the output voltage of rectifier 5 is peaked, the voltage is above that of battery 11 and the rectifier accordingly supplies current both to the load and to the battery. The current supplied to the battery through portion $b$ of winding 14 is in a direction opposite that of current supplied to the load through portion $a$ of winding 14, hence magnetic fluxes having opposing directions are set up in core 13. These opposing fluxes tend to reduce the impedance of the two portions of winding 14, thereby better enabling the rectifier to supply current to both the load and battery. When the current in the two portions is such that the ampere turns are equal, the two opposing fluxes substantially cancel each other and the impedance of the two portions is of course reduced to a minimum, whereas when the ampere turns of the two portions are unbalanced, a resultant flux exists in core 13 and as a result the impedance characteristics of these windings become increasingly large as the unbalanced flux increases in magnitude. If, for example, the current supplied to the battery tends to rise to a value above that required to balance the ampere turns in winding portion $a$, a net flux will exist in the core and the impedance of the other portion $b$ will increase and tend to prevent this increase in current. On the other hand, if the load current increases due to a decrease in the load impedance, more current will flow in winding portions $a$ and $b$ and the current division will be such as to tend to maintain the net ampere turns at the ideal balanced condition wherein the impedance of the two portions of winding 14 are at a minimum. The current which is supplied to the battery during the periods of peak rectified voltage is thus proportional to the load current, and by proportioning portions $a$ and $b$ of winding 14, this charging current may be made greater, equal to or less than the load current as desired.

During the alternate valley periods when the output voltage of rectifier 5 decreases to a value below the terminal voltage of battery 11, the battery tends to supply current through the entire winding 14 to the load. This current traverses both portions of winding 14 in the same direction, hence it establishes flux of one direction in core 13 and the current supplied to the load from the battery accordingly is limited in magnitude since it encounters the combined impedance of the two portions of winding 14, as well as the impedance of the load. The impedance of winding 14 may, by suitable design of the magnetic circuit of reactor 12, be made to vary as the load current varies. For example, the design may be such that the impedance is increased with an increase in the net ampere turns, with the result that as the load current supplied from the battery increases to in turn increase the net ampere turns available during the valley intervals in the rectifier output, winding 14 becomes increasingly effective in preventing the battery from supplying current to the load during these valley intervals.

It follows, therefore, that since during the peaks of the rectifier voltage the charge to the battery increases as the load current increases, while the discharge from the battery to the load is restricted during the remaining portions of each half cycle, the net current from the battery at all loads, and particularly at full load, is appreciably less than it would have been if the regulating reactor were not present. It is apparent, therefore, that by suitably proportioning the winding and parts of the regulating reactor, it is possible to have the net discharge from the battery remain substantially constant for wide variations in load current, thus enabling the life of the stand-by battery to be materially lengthened.

Although I have herein shown and described only one form of regulating apparatus embodying my invention, it is understood that various changes and modifications may be made therein within the scope of the appended claims without departing from the spirit and scope of my invention.

Having thus described my invention, what I claim is:

1. In combination with a direct current load, a battery, a rectifier and a source of alternating current connected with the input terminals of the rectifier, the terminal voltage of the battery having a value less than the peak value of the voltage of said rectifier, a reactor comprising a magnetizable core provided with a winding which when energized constitutes the sole source of flux for said core, said winding having a mid-terminal tap dividing the winding into two equal turn portions, said tap being connected with one output terminal of said rectifier, said winding having one end terminal connected with the corresponding one terminal of said battery and having the other end terminal connected through said load to the other terminal of said rectifier and said battery.

2. In combination, a direct current load, a rectifier, a battery, and a source of alternating current connected with the input terminals of the rectifier, a reactor comprising a magnetizable core provided with a winding which when energized constitutes the sole source of flux for said core, said winding having a mid-terminal tap dividing the winding into two equal turn portions, said tap being connected with one output terminal of said rectifier, said winding having one end terminal connected with the corresponding one terminal of said battery and having the other end terminal connected through said load with the other terminal of said rectifier and battery, the rectifier current dividing between said load and battery and flowing in opposite directions in said two winding portions to create opposing fluxes in said core during peak voltage intervals of said rectifier and the battery current flowing through the entire winding to create cumulative flux in said core during minimum voltage intervals of said rectifier.

3. In combination, a direct current load, a rectifier, a battery, and a source of alternating current connected with the input terminals of said rectifier, the terminal voltage of said battery having a value less than the peak value of the voltage of said rectifier, a reactor comprising a magnetizable core provided with a winding which when energized constitutes the sole source of flux for said core, a mid-terminal tap for said winding dividing the winding into two equal turn portions, said tap connected with one output terminal of said rectifier, one end terminal of said winding connected with the corresponding one terminal of said battery and the other end terminal of said winding connected through said load to the other terminal of said rectifier and said battery, whereby the rectifier current divides between said load and battery and flows in opposite directions in the two winding portions to create opposing fluxes in said core during peak voltage intervals of said rectifier and battery current flows through the entire winding to said load to create cumulative flux during minimum voltage intervals of said rectifier.

LINNIE K. HEDDING.